United States Patent

[11] 3,620,968

| [72] | Inventors | Alan G. Bridge<br>El Cerrito;<br>Joseph Jaffe, Berkeley; David S. Mitchell,<br>Fairfax, all of Calif. |
|---|---|---|
| [21] | Appl. No. | 772,365 |
| [22] | Filed | Oct. 31, 1968 |
| [45] | Patented | Nov. 16, 1971 |
| [73] | Assignee | Chevron Research Company<br>San Francisco, Calif.<br>The portion of the term of the patent<br>subsequent to Dec. 12, 1987, has been<br>disclaimed. |

[54] DESULFURIZATION PROCESS EMPLOYING UPFLOW OIL AND HYDROGEN
1 Claim, No Drawings

| [52] | U.S. Cl. | 208/216 |
|---|---|---|
| [51] | Int. Cl. | C10g 23/02 |
| [50] | Field of Search | 208/216 |

[56] References Cited
UNITED STATES PATENTS

| 3,291,751 | 12/1966 | Buss | 208/216 |
|---|---|---|---|
| 2,917,456 | 12/1959 | Ashley | 208/216 |
| 3,183,179 | 5/1965 | Schuman | 208/216 |
| 3,205,165 | 9/1965 | Hilfman | 208/216 |
| 3,285,860 | 11/1966 | Richardson | 208/216 |
| 3,363,992 | 1/1968 | Chervenak | 208/216 |

*Primary Examiner*—Delbert E. Gantz
*Assistant Examiner*—G. J. Crasanakis
*Attorneys*—A. L. Snow, F. E. Johnston, G. J. Tonkin and Roy H. Davies ABSTRACT: Hydrodesulfurization of a hydrocarbon oil feedstock is performed by passing the oil and hydrogen upwardly in cocurrent flow through at least one fixed bed of catalyst contained in a desulfurization reactor. The catalyst comprises pellets or other particles of alumina cogelled with a Group VI hydrogenating component, a Group VIII hydrogenating component, Group IV metal phosphate particles dispersed in said catalyst, and fluorine. The upflow oil and hydrogen operation with a cogel catalyst provides for higher activities and low initial fouling rates.

DESULFURIZATION PROCESS EMPLOYING UPFLOW OIL AND HYDROGEN

INTRODUCTION

The present invention relates to catalytic hydrodesulfurization of hydrocarbon oils, particularly hydrocarbon oils containing a substantial proportion of materials boiling above 500° F. and containing from 0.5 to 10 weight percent of organic sulfur.

PRIOR ART AND NEED FOR IMPROVEMENTS

Catalytic hydrodesulfurization as such is old and well known, and many patents exist that disclose various catalytic hydrodesulfurization problems and solutions. See, for example, A. J. de Rosett et al. U.S. Pat. No. 2,671,754. However, there is a continuing need for additional improvements in catalytic hydrodesulfurization processes, particularly in view of the widespread efforts being made in the United States and abroad in connection with air pollution control. The additional improvements can lie primarily in the area of desulfurization catalysts. See, for example, the copending Joseph Jaffe patent application Ser. No. 743,003, filed July 8, 1968, which issued as U.S. Pat. No. 3,544,452 on Dec. 1, 1970 for "-Fluorine and Metal-Phosphate Containing Catalysts and Preparation and Use Thereof." The additional improvements can lie in the area of desulfurization process flow arrangements, either alone or together with improved desulfurization catalysts. Additional improvements that lie in the area of desulfurization process flow arrangements, which are effective not only to provide a more efficient, economical or practical process operation, but which also are effective to improve the desulfurization activity and/or stability of both old and new desulfurization catalysts, are among the most attractive and desired goals of modern catalytic hydrodesulfurization research.

OBJECTS

In view of the foregoing, it is an object of the present invention to provide an improvement in catalytic hydrodesulfurization processes, which is effective in (a) improving the activities and stabilities of many of the older prior art desulfurization catalysts, and (b) further improving the activities and stabilities of many more recent hydrodesulfurization catalysts, which in themselves have improved activities and stabilities compared with said older catalysts.

STATEMENT OF INVENTION

In accordance with the present invention there is provided a process for catalytic hydrodesulfurization of a hydrocarbon oil feedstock containing a substantial proportion of materials boiling above 500° F., containing from 0.5 to 10 weight percent organic sulfur, and containing 10 to 1,500 parts per million metals, which comprises passing said feedstock and 500 to 20,000 s.c.f. of hydrogen per barrel of said feedstock upwardly in concurrent flow through a reaction vessel, and through at least one fixed bed, contained in said vessel, of pellets or other particles of a desulfurization catalyst comprising alumina, a Group VI metal or metal compound hydrogenating component and a Group VIII metal or metal compound hydrogenating component, at a temperature in the range 500° to 95020 F., a pressure in the range 500 to 5,000 p.s.i.g. and a liquid hourly space velocity of 0.3 to 5.0 volumes of said feedstock per volume of catalyst per hour, and recovering from an upper portion of said vessel a hydrocarbon oil having a substantially lower organic sulfur content than said hydrocarbon oil feedstock.

In the process of the present invention, contrary to many prior art processes, a major proportion of the hydrocarbon feedstock is in liquid phase during contact with the desulfurization catalyst.

In the process of the present invention, the organic sulfur content of the feed is reduced from the original value of 0.5 to 10 weight percent to 0 to 3 weight percent, with use of hydrocarbon feedstocks containing organic sulfur in amounts at or near the lower end of said 0.5–10 weight percent range resulting in products having an organic sulfur content at or near the lower end of said 0–3 weight percent range, and vice versa. Those skilled in the art will recognize that the actual organic sulfur content of the product with the use of any particular hydrocarbon feedstock will be a function of the severity of the desulfurization conditions, with more severe conditions, within the ranges of conditions given herein, resulting in a greater reduction in organic sulfur.

Those skilled in the art also will recognize that, particularly with hydrocarbon feedstocks having higher organic sulfur contents, removal of the last traces of organic sulfur requires inordinately more severe conditions than removal of most, but not all, of the organic sulfur. Accordingly, while in any case the process of the present invention will be operated to provide a product containing 0 to 3 weight percent organic sulfur, in a preferred embodiment the organic sulfur content of the product will be 0.1 to 2 weight percent, preferably 0.2 to 2 weight percent, and more preferably 0.2 to 1.5 weight percent.

HYDROCARBON FEEDSTOCKS

Hydrocarbon feedstocks suitable for use in the process of the present invention will contain a substantial proportion of materials boiling above 500° F., and will contain 0.5 to 10 weight percent organic sulfur. Hydrocarbon feedstocks containing the indicated amount of sulfur, further containing 10 to 1,500 p. p. m. total metals, and containing a substantial proportion of materials boiling in the range 500° to 1,500° F., particularly including hydrocarbon residua and solvent-deasphalted residua, are especially suitable.

When the feedstocks have not been subjected to a prior deasphalting treatment, they may contain up to 50 volume percent asphaltenes.

When the feedstocks have been subjected to a prior deasphalting treatment, for example solvent deasphalting such as propane deasphalting, generally they will have a low volumetric asphaltene content, but still will have a substantial organic sulfur content, within the above ranges, and a substantial metals content, within the above ranges.

Particular examples of suitable feedstocks are 500° F.+ California, Boscan and Middle East residua, either as such or that have been subjected to a prior deasphalting treatment. Typical solvent-deasphalted portions of said feedstocks have metals and organic sulfur contents as follows:

|  | Nickel + Vanadium, p.p.m. | Organic Sulfur, wt.% |
|---|---|---|
| California SDA oil | 10–70 | 0.5–1.2 |
| Boscan SDA oil | 5–300 | 2–4 |
| Arabian light SDA oil | 5–15 | 2–3 |

The nickel plus vanadium contents and the organic sulfur contents of the aforesaid residua prior to said deasphalting treatment are beyond the high ends of the above ranges.

CATALYSTS

The hydrodesulfurization catalysts used in the process of the present invention include any hydrodesulfurization catalysts comprising alumina, a Group VI metal or metal compound hydrogenating component, and a Group VIII metal or metal compound-hydrogenating component. Fluorine may be present in the catalyst. Conventional $NiMoAl_2O_3$, $NiWAl_2O_3$, $NiMoAl_2O_3$, $F$, $NiWAl_2O_3F$, $NiMoSiO_2Al_2O_3$, $NiWSiO_2Al_2O_3$, $CoMoAl_2O_3$, and $CoMoAl_2O_3F$ catalysts are operable, and are improved in activity and/or stability when used in the process of the present invention.

Particularly preferred catalysts for use in the process of the present invention are those disclosed in the aforementioned patent to Joseph Jaffe, who is also one of the inventors herein. The catalysts disclosed in said application when used in the process of the present invention provide a particularly effective combination for catalytic desulfurization. The catalysts disclosed in said application include Group VI and Group VIII components, a Group IV metal phosphate, and alumina. The presence of fluorine enhances the desulfurization efficacy of said catalysts.

The most dramatic improvements in catalyst activity and stability that are obtainable with the process of the present invention are obtained when catalysts are used that have been prepared by cogelation of the component comprising alumina with the Group VI and VIII hydrogenating components, rather than when catalysts are used that have been prepared by impregnation of an alumina or alumina-containing support with one or more of the hydrogenating components. When substantially all of the pores of such cogel catalysts are micropores, that is, pores less than 1,000 Angstroms in diameter, the improvement in catalyst activity and stability resulting from use of the catalysts in the process of the present invention, compared with use in prior art type process flow arrangements, is especially impressive.

OPERATING CONDITIONS

The process of the present invention is operated at the following conditions:
1. Cocurrent upflow hydrogen and oil, with a major portion of the oil being in liquid phase;
2. Total hydrogen rate 500 to 20,000 s.c.f., preferably 2,000 to 15,000 s.c.f., per barrel of hydrocarbon feedstock.
3. Temperature 500° to 950° F., preferably 600° to 850° F.
4. Pressure 500–5,000 p.s.i.g., preferably 1,000–3,000 p.s.i.g.
5. Liquid hourly space velocity (LHSV) 0.3–5,0, preferably 0.3–3.0.

EXAMPLES

Example 1

An impregnated catalyst (Catalyst A), consisting of nickel sulfide, molybdenum sulfide and alumina, having the following composition, was prepared:

|  | Wt.% |
| --- | --- |
| NiO, calculated as metal | 2.8 |
| $MoO_3$, calculated as metal | 13.0 |
| $Al_2O_3$ | Balance |

Catalyst A was used in a first run to hydrodesulfurize a portion of a 600° F.+ Arabian light residuum feedstock, containing 2.9 weight percent organic sulfur, in a fixed bed reactor under the following conditions:
Run duration, hours, approx. — 600
Pressure, p.s.i.g. — 1,400
Space velocity, v./v./hr. — 1.2
Total hydrogen rate, s.c.f./bbl. of feedstock — 2,000
Direction of oil flow through reactor — Down
Direction of $H_2$ flow through reactor — Down
Product organic sulfur content, wt.% — 1.0
Temperature, °F. — See below
Phase of major portion of oil — liquid Catalyst A was then used in a second run to hydrodesulfurize another portion of the same feedstock in a reactor under the same conditions except that the direction of oil flow through the reactor was up, and the direction of hydrogen flow through the reactor was up.

The results of the two runs were as follows:

|  | Oil and Hydrogen | |
| --- | --- | --- |
|  | Downflow | Upflow |
| Starting Temperature, °F. | 737 | 704 |
| Fouling Rate, °F./hr. | 0.03 | 0.05 |

From this example it will be noted that the upflow oil and hydrogen operation resulted in a starting temperature, for the same degree of desulfurization, over 30° F. lower than for the downflow oil and hydrogen operation, at a catalyst fouling rate not substantially greater than in the downflow oil and hydrogen operation.

Example 2

An impregnated catalyst (Catalyst B), consisting of nickel sulfide, molybdenum sulfide and silica-alumina, having the following composition, was prepared:

|  | Wt.% | Ratio |
| --- | --- | --- |
| NiO, calculated as metal | 5.8 |  |
| $MoO_3$, calculated as metal | 17.8 |  |
| $SiO_2.Al_2O_3$ | Balance |  |
| $SiO_2/Al_2O_3$ |  | 22/78 |

Catalyst B was used in a first run to hydrodesulfurize another portion of the Arabian light residuum feedstock referred to in example 1, in a fixed bed reactor at the same conditions used in the first run of example 1, including a downward flow of hydrogen and oil through the reactor, except that the run duration was approximately 250 hours.

Catalyst B was then used in a second run to hydrodesulfurize another portion of the same feedstock in a reactor at the same conditions used in the second run of example 1, including an upward flow of hydrogen and oil through the reactor, except that the run duration was approximately 400 hours.

The results of the two runs were as follows:

|  | Oil and Hydrogen | |
| --- | --- | --- |
|  | Downflow | Upflow |
| Starting Temperature, °F. | 742 | 713 |
| Fouling Rate, °F./hr. | 0.26 | 0.24 |

FRom this example it will be noted that the upflow oil and hydrogen operation resulted in a starting temperature, for the same degree of desulfurization, of about 30° F. lower than for the downflow oil and hydrogen operation, at a catalyst fouling rate slightly lower than in the downflow oil and hydrogen operation.

Example 3

A cogelled catalyst (Catalyst C) consisting of nickel oxide, molybdenum oxide, titanium phosphate, fluorine and alumina, having the following composition, was prepared in accordance with the procedures in the Jaffe patent, U.S. Pat. No. 3,544,452:

|  | Wt.% |
| --- | --- |
| NiO | 10.5 |
| $MoO_3$ | 30 |
| $TiO_2$ | 10 |
| $P_2O_5$ | 5 |
| F | 4.5 |
| $Al_2O_3$ | 40 |
| Total | 100.0 |

Catalyst C was used in a first run to hydrodesulfurize a portion of a 650° F.+ Safaniya atmospheric residuum feedstock, containing 4.3 weight percent organic sulfur, in a fixed bed reactor under the following conditions:
Run duration, hours, approx. — 500
Pressure, p.s.i.g. — 1,900
Space velocity, v./v./hr. — 1.0
Total hydrogen rate, s.c.f./bbl. of feedstock — 10,000
Direction of oil flow through reactor — Down Direction of H$_2$ flow through reactor — Down
Product organic sulfur content, wt.% — 1.0
Temperature, °F. — See below
Phase of major portion of oil — Liquid Catalyst C was then used in a second run to hydrodesulfurize another portion of the seam feedstock in a reactor under the same conditions, except that the direction of oil flow through the reactor was up, and the direction of hydrogen flow through the reactor was up.

The results of the two runs were as follows:

|  | Oil and Hydrogen | |
|---|---|---|
|  | Downflow | Upflow |
| Starting Temperature, °F. | 712 | 695 |
| Temperature at 500 Hours, °F. | 733 | 722 |
| Fouling Rate, °F./hr. | 0.04 | 0.05 |

From this example it will be noted that the upflow oil and hydrogen operation resulted in a starting temperature, for the same degree of desulfurization, of 17° F. lower than for the downflow oil and hydrogen operation, and that at the end of 500 hours the temperature needed to maintain the same degree of desulfurization was still 11° F. lower than for the downflow operation.

Example 4

The first and second runs of example 3 were continued to total run lengths of 850 hours. The results of the two runs then were as follows:

|  | Oil and Hydrogen | |
|---|---|---|
|  | Downflow | Upflow |
| Temperature at 800 Hours, °F. | 766 | 737.5 |
| Temperature at 850 Hours, °F. | 780 | 740 |
| Fouling Rate, °F./hr. | 0.28 | 0.05 |

From this example it will be noted that in the upflow oil and hydrogen operation the catalyst-fouling rate during the last 50 hours operation was unchanged from the rate in example 3, whereas in the downflow oil and hydrogen operation the catalyst fouling rate curing the last 50 hours operation was 7 times the fouling rate in example 3. It is believed that the intolerable increase in fouling rate in the downflow operation at least in part is attributable to metals deposition on the catalyst in a nonuniform distribution, and/or at an excessive rate.

CONCLUSIONS

While we do not intend to be bound by any theory used to explain the greatly improved results obtainable with the process of the present invention compared with prior art desulfurization processes, it is believed that the following observations are pertinent, and that they are useful aids in further understanding the process of the invention:

1. The upflow oil and hydrogen operation with a given catalyst, compared with prior art operations, results in:
   a. lower rate of metals deposition on the catalyst;
   b. more even distribution of metals deposited on the catalyst, which permits initial low fouling rate to be maintained during longer on-stream periods;
   c. lower starting temperatures and lower operating temperatures at a given number of hours on stream, which may at least in part account for (a) and (b);
2. The upflow oil and hydrogen operation is especially useful when it is practiced with cogel catalysts, which directionally have been found to have higher activities and low initial fouling rates, compared with impregnated catalysts; the upflow oil and hydrogen operation permits the low fouling rates to be maintained longer than with prior art types of operation.

What is claimed is:

1. A process for catalytic hydrodesulfurization of a hydrocarbon oil feedstock containing a substantial proportion of material boiling above 500° F., containing from 0.5 to 10 weight percent organic sulfur, and containing 10 to 1,500 parts per million metals, which comprises passing said feedstock and 500 to 20,000 s.c.f. of hydrogen per barrel of said feedstock upwardly in cocurrent flow through a reaction vessel, and through at least one fixed bed, contained in said vessel, of pellets or other particles of a desulfurization catalyst comprising alumina cogelled with a Group VI metal or metal compound hydrogenating component, a Group VIII metal or metal compound hydrogenating component, Group IV metal phosphate particles dispersed in said catalyst and fluorine, at at temperature in the range 500° to 950° F., a pressure in the range 500 to 5,000 p.s.i.g., and a liquid hourly space velocity of 0.3 to 5.0 volumes of said feedstock per volume of catalyst per hour and recovering from an upper portion of said vessel a hydrocarbon oil having a substantially lower organic sulfur content than said hydrocarbon oil feedstock.

* * * * *